Nov. 18, 1969  HANS-KARL DAUR  3,478,539
JOINT COUPLING
Filed Nov. 24, 1967
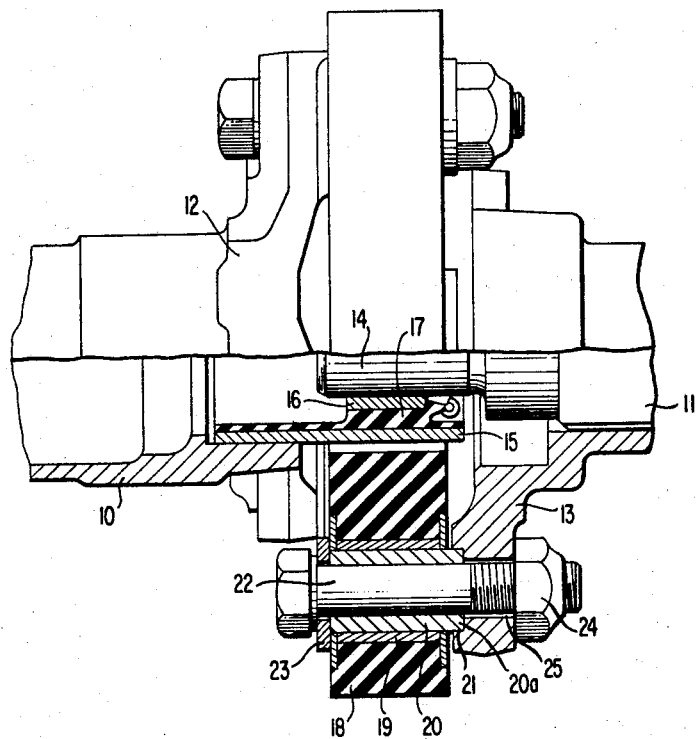
INVENTOR
HANS-KARL DAUR
BY  *Craig & Antonelli*
ATTORNEYS

5

United States Patent Office 3,478,539
Patented Nov. 18, 1969

3,478,539
JOINT COUPLING
Hans-Karl Daur, Stuttgart-Bad Cannstatt, Germany, assignor to Daimler-Benz Aktiengesellschaft, Stuttgart-Unterturkheim, Germany
Filed Nov. 24, 1967, Ser. No. 685,483
Claims priority, application Germany, Nov. 26, 1966,
D 51,653
Int. Cl. F16d 3/78
U.S. Cl. 64—13                                        10 Claims

ABSTRACT OF THE DISCLOSURE

A joint coupling for the jointed connection of two shafts by means of a torque-transmitting elastic joint disk, in which the latter is alternately connected with the coupling halves by means of coupling bolts mutually offset in the circumferential direction whereby the coupling bolts extend through bushings which are inserted into bores provided therefor in the joint disk and are extended beyond the elastic joint disk up to recesses provided in the coupling halves which receive the bushings with appropriate fit.

BACKGROUND OF THE INVENTION

The present invention relates to a joint coupling for the jointed connection of two shafts by means of an elastic joint disk transmitting the torque, which is alternately connected with the coupling halves by means of coupling bolts mutually displaced in the circumferential direction. The coupling bolts are thereby constructed as a rule as reamed or fitted bolts which serve for the transmission of the torque to the joint disk and have to be fitted very accurately, thereby entailing relatively high manufacturing and assembly costs.

SUMMARY OF THE INVENTION

The present invention aims above all at a simplified and economic manufacture and essentially consists in that coupling bolts extend through bushings which are inserted into bores of the joint disk and are extended or prolonged up to recesses fittingly receiving the bushings in the respectively coordinated coupling halves. The coupling bolts may thereby extend through the bores of the coupling halves with play without having to be centered therein. Since they are relieved from the forces transmitting the torque, they have only or essentially only the task to keep together the elastic joint disk and the coupling halves of the drive coupling in the axial direction. The fitting of the torque-transmitting bushings into the recesses of the coupling halves accommodating the same can, on the other hand, take place without special difficulties or larger work expenditures.

Preferably, the torque-transmitting bushing is arranged within a further protective bushing or sleeve embedded directly in the elastic material of the joint disk. Furthermore, for purposes of centering the shaft sections the shafts to be coupled are centered by being nested one in the other or are centered in the coupling disks by means of inserted centering bushings concentric to the axis of the shaft.

Accordingly, it is an object of the present invention to provide a joint coupling of the type described above which eliminates by simple means the aforementioned shortcomings and drawbacks encountered in the prior art.

Another object of the present invention resides in a joint coupling which is simple in construction, inexpensive to manufacture and easy to assemble and install.

Still another object of the present invention resides in a joint disk of the type described above in which the time-consuming fitting of torque transmitting bolts is eliminated.

These and other objects, features, and advantages of the present invention will become more obvious from the following description when taken in connection with the accompanying drawing which shows, for purposes of illustration only, one embodiment in accordance with the present invention, and wherein:

The single figure is a partial longitudinal cross-sectional view through one embodiment of a coupling in accordance with the present invention.

Referring now to the single figure of the drawing, reference numeral 10 designates therein the driving or input shaft while reference numeral 11 designates the driven or output shaft; the former is connected in one piece with a driving coupling half 12 while the other coupling half 13 is mounted in a non-rotatable manner, for example, by a splined or key-way connection or the like, on the driven shaft 11. The output or driven shaft 11 is provided with a forwardly directed extension 14 which cooperates for purposes of centering with a centering sleeve 15 which, in turn, is inserted into an aperture of the hollow input shaft 10 and is in sliding contact with the extension 14 of the output shaft 11 under interposition of a bushing 17 of elastic material, for example, of rubber or synthetic resinous material, by way of a glide bearing 16 of any conventional construction.

The elastic joint disk 18, for example, of rubber or a rubber-like material, which is alternately connected with the one and the other coupling halves 12 and 13, for example, in two or three points each distributed over the circumference, serves for the transmission of torque from the driving coupling half 12 to the driven coupling half 13. The elastic joint disk 18 is provided for this purpose with protective bushings 19 into whose bore are inserted the centering bushings 20. The centering bushings 20 engage axially with the ends 20a thereof extended beyond the joint disk 18 into recesses 21 of the associated coupling half 12 or 13, whereby they are fitted into these recesses with the requisite fits. The centering bushings 20 are traversed by the coupling bolts 22 which axially clamp together the elastic joint disk 18 and the coupling halves 12 or 13 by means of the nut 24 and by the interposition of a washer 23 and are thereby able to extend with play 25 through the coupling halves 12 and 13.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications.

What is claimed is:
1. A joint coupling for the torque-transmitting connection of two shafts by means of an elastic joint disk interposed between two flanged coupling halves provided at the coupling ends of the respective shafts, the elastic joint disk being connected alternately to a respective flanged coupling half by means of coupling bolts spaced annularly about said elastic joint disk, wherein the improvement comprises bushing means inserted within bores provided in the elastic joint disk for accommodating the coupling bolts, said bushing means extending through said joint disk and into a recess provided in the respective flanged coupling half, said recess fittingly receiving said bushing means, said annularly-spaced coupling bolts alternately extending through said joint disk and a respective flanged coupling half, said bores provided in said flanged coupling halves having a diameter exceeding that of said coupling bolts, thus affording play between the peripheral surface of the bolts and the surface of the respective bore in said respective coupling half.

2. A joint coupling according to claim 1, wherein said bushing means is arranged within a further protective bushing means embedded directly in the elastic material of the joint disk.

3. A joint coupling according to claim 2, further comprising means for centering the shafts to be coupled.

4. A joint coupling according to claim 3, wherein the centering means includes a nested arrangement of the shafts.

5. A joint coupling according to claim 3, wherein the centering means includes a centering bushing disposed concentrically to the axis of the shafts and inserted into the coupling halves by the interposition of a yieldable bushing.

6. A joint coupling according to claim 1, wherein said bushing means is arranged within a further protective bushing means embedded directly in the elastic material of the joint disk.

7. A joint coupling according to claim 6, further comprising means for centering the shafts to be coupled.

8. A joint coupling according to claim 1, further comprising means for centering the shafts to be coupled.

9. A joint coupling according to claim 8, wherein the centering means includes a nested arrangement of the shafts.

10. A joint coupling according to claim 8, wherein the centering means includes a centering bushing disposed concentrically to the axis of the shafts and inserted into the coupling halves by the interposition of a yieldable bushing.

References Cited

UNITED STATES PATENTS

| 1,387,532 | 8/1921 | Dexter | 64—13 |
| 2,396,353 | 3/1946 | Venditty | 64—11 X |

FOREIGN PATENTS

| 943,445 | 12/1963 | Great Britain. |
| 513,258 | 2/1955 | Italy. |

HALL C. COE, Primary Examiner